United States Patent
Jones et al.

(10) Patent No.: US 6,830,240 B2
(45) Date of Patent: Dec. 14, 2004

(54) METHODS AND APPARATUS FOR SECURING COMPONENTS FOR MANUFACTURE

(75) Inventors: Daniel Edward Jones, Hamilton, OH (US); Jacques Juneau, Amelia, OH (US)

(73) Assignee: General Electric Company, Schenectady, NY (US)

( * ) Notice: Subject to any disclaimer, the term of this patent is extended or adjusted under 35 U.S.C. 154(b) by 79 days.

(21) Appl. No.: 10/253,344

(22) Filed: Sep. 24, 2002

(65) Prior Publication Data

US 2004/0056399 A1 Mar. 25, 2004

(51) Int. Cl.[7] ............................................... B23Q 3/00
(52) U.S. Cl. ...................... 269/32; 269/154; 269/224; 269/266; 269/254 R; 269/156; 269/909; 269/270
(58) Field of Search ................................ 269/270, 154, 269/224, 266, 254 R, 254 CS, 156, 909

(56) References Cited

U.S. PATENT DOCUMENTS

| | | | |
|---|---|---|---|
| 4,026,073 A | 5/1977 | Betzler | |
| 4,142,332 A | 3/1979 | Clarke | |
| 4,455,787 A | 6/1984 | Sharon | |
| 5,001,868 A | 3/1991 | Jankus et al. | |
| 5,097,634 A | 3/1992 | Hulme | |
| 5,137,263 A | * 8/1992 | Savoie et al. | 269/254 CS |
| 5,494,408 A | 2/1996 | Seeley et al. | |
| 6,065,744 A | 5/2000 | Lawrence | |
| 6,237,907 B1 | 5/2001 | Lawrence | |

* cited by examiner

Primary Examiner—Robert C. Watson
(74) Attorney, Agent, or Firm—William Scott Andes; Armstrong Teasdale LLP

(57) ABSTRACT

A method for securing a component for manufacture. The method includes fixedly coupling a first clamping member and a biasing mechanism to a tool that includes a fixture. The fixture includes a first clamping member, a second clamping member, and a biasing mechanism. The method further includes coupling the second clamping member to the fixture, using the biasing mechanism to align the component within the tool between the first and second clamping members such that the component is maintained in position relative to the fixture, securing the component between the first and second clamping members such that the first clamping member, the second clamping member, and the component are fixedly secured in position with respect to the fixture, and retaining the component in position with respect to the fixture using the first and second clamping members.

13 Claims, 6 Drawing Sheets

METHODS AND APPARATUS FOR SECURING COMPONENTS FOR MANUFACTURE

BACKGROUND OF THE INVENTION

This invention relates generally to manufacturing techniques, and more specifically to methods and apparatus for securing components for manufacture.

Accurate manufacturing of a component may be a significant factor in determining a manufacturing time of the component. Specifically, when the component is a gas turbine engine blade, accurate manufacturing of the blade may be one of the most significant factors affecting an overall cost of fabrication of the gas turbine engine, as well as subsequent modifications, repairs, and inspections of the blade. For example, gas turbine engine blades include a tip shroud that typically requires an accurately machined radius along the tip and center section of the blade. The radius is established using a system of datums referenced about the profile of the blade. More specifically, to establish the datums, the blades must be rigidly held during manufacturing, such that the tip shroud is maintained in position without distorting the blade profile.

At least some known manufacturing processes encapsulate a cast gas turbine engine blade in a tin-bismuth matrix wherein datums from the cast blade are transferred to the matrix. However, using such a matrix does not always produce accurate results that are reliable or easily repeatable. In addition, using a matrix may require multiple fixtures, machines, and/or processes. Furthermore, a matrix may decrease how rigidly the blade is held during manufacturing, which may result in a slower manufacturing time of the blade.

BRIEF DESCRIPTION OF THE INVENTION

In one aspect, a method is provided for securing a component for manufacture. The method includes fixedly coupling a first clamping member and a biasing mechanism to a tool that includes a fixture. The fixture includes a first clamping member, a second clamping member, and a biasing mechanism. The method further includes coupling the second clamping member to the fixture, using the biasing mechanism to align the component within the tool between the first and second clamping members such that the component is maintained in position relative to the fixture, securing the component between the first and second clamping members such that the first clamping member, the second clamping member, and the component are fixedly secured in position with respect to the fixture, and retaining the component in position with respect to the fixture using the first and second clamping members.

In another aspect, a tool is provided including a fixture, a first clamping member fixedly coupled to the fixture, a biasing mechanism fixedly coupled to the fixture for biasing a component against the first clamping member, and a second clamping member coupled to the fixture. The first and second clamping members are configured to retain the component therebetween.

In yet another aspect, an apparatus is provided for securing a component. The apparatus includes a fixture, a first clamping member fixedly coupled to the fixture, a biasing mechanism fixedly coupled to the fixture and configured to bias the component against the first clamping member, and a second clamping member coupled to the fixture. The first and second clamping members are configured to fixedly secure the component in position with respect to the fixture.

DETAILED DESCRIPTION OF THE INVENTION

As used herein, the terms "manufacture" and "manufacturing" may include any manufacturing process. For example, manufacturing processes may include grinding, finishing, polishing, cutting, machining, inspecting, and/or casting. The above examples are intended as exemplary only, and thus are not intended to limit in any way the definition and/or meaning of the terms "manufacture" and "manufacturing". In addition, as used herein the term "component" may include any object to which a manufacturing process is applied. Furthermore, although the invention is described herein in association with a gas turbine engine, and more specifically for use with a turbine blade for a gas turbine engine, it should be understood that the present invention may be applicable to any component and/or any manufacturing process. Accordingly, practice of the present invention is not limited to the manufacture of turbine blades or other components of gas turbine engines.

Figure 1:
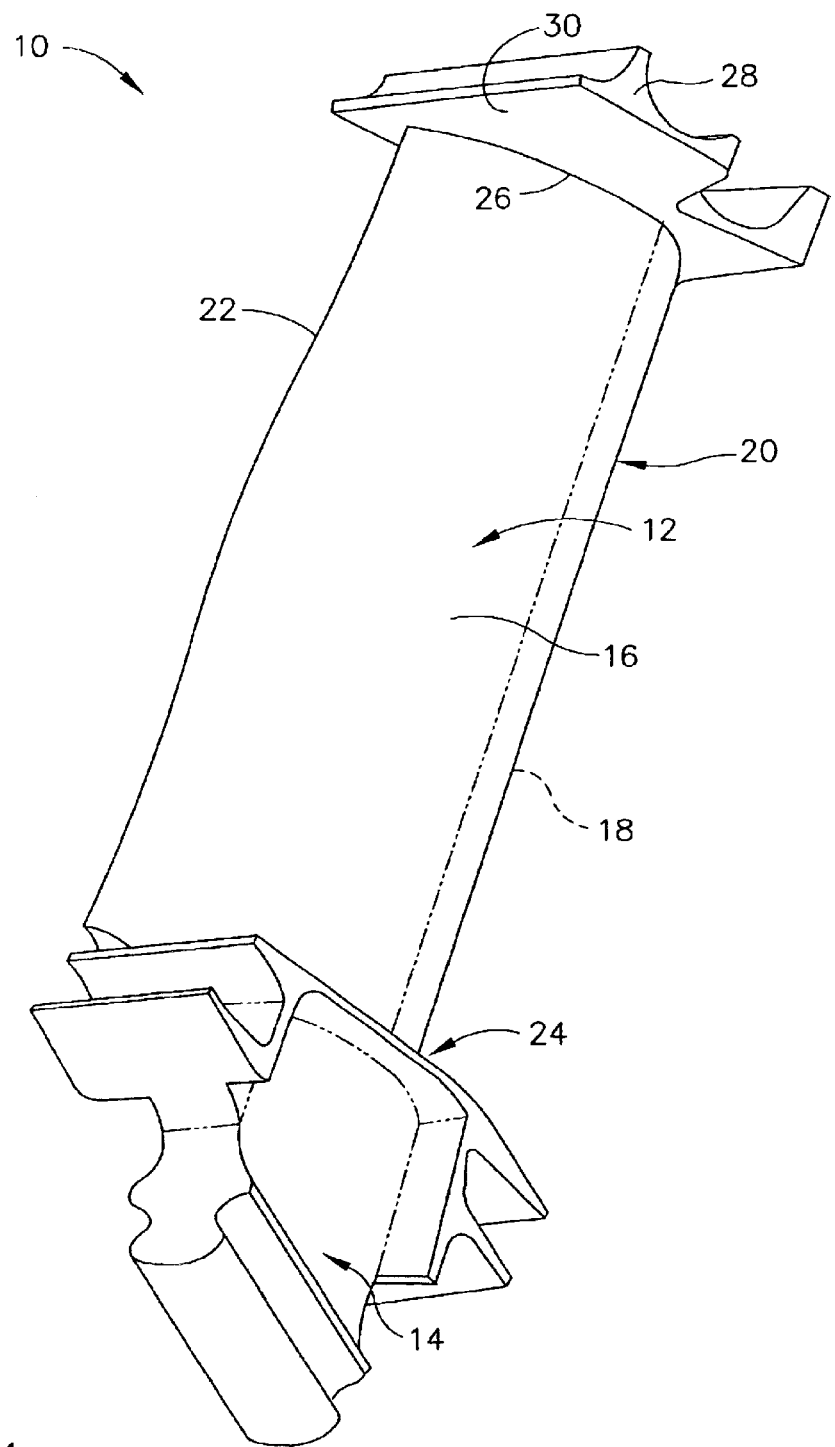
FIG. 1 is a perspective view of an exemplary gas turbine engine blade.

FIG. 1 is a perspective view of a turbine blade 10 that may be used with a gas turbine engine (not shown). In one embodiment, a plurality of turbine blades 10 form a high-pressure turbine rotor blade stage (not shown) of the gas turbine engine. Each blade 10 includes a hollow airfoil 12 and an integral dovetail 14 that is used for mounting airfoil 12 to a rotor disk (not shown) in a known manner. Alternatively, blades 10 may extend radially outwardly from a disk (not shown), such that a plurality of blades 10 form a disk (not shown).

Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26. In one embodiment, airfoil tip 26 includes a tip shroud 28 extending radially outward therefrom in a direction away from airfoil 12. Tip shroud 28 includes a bottom surface 30.

Figure 2:
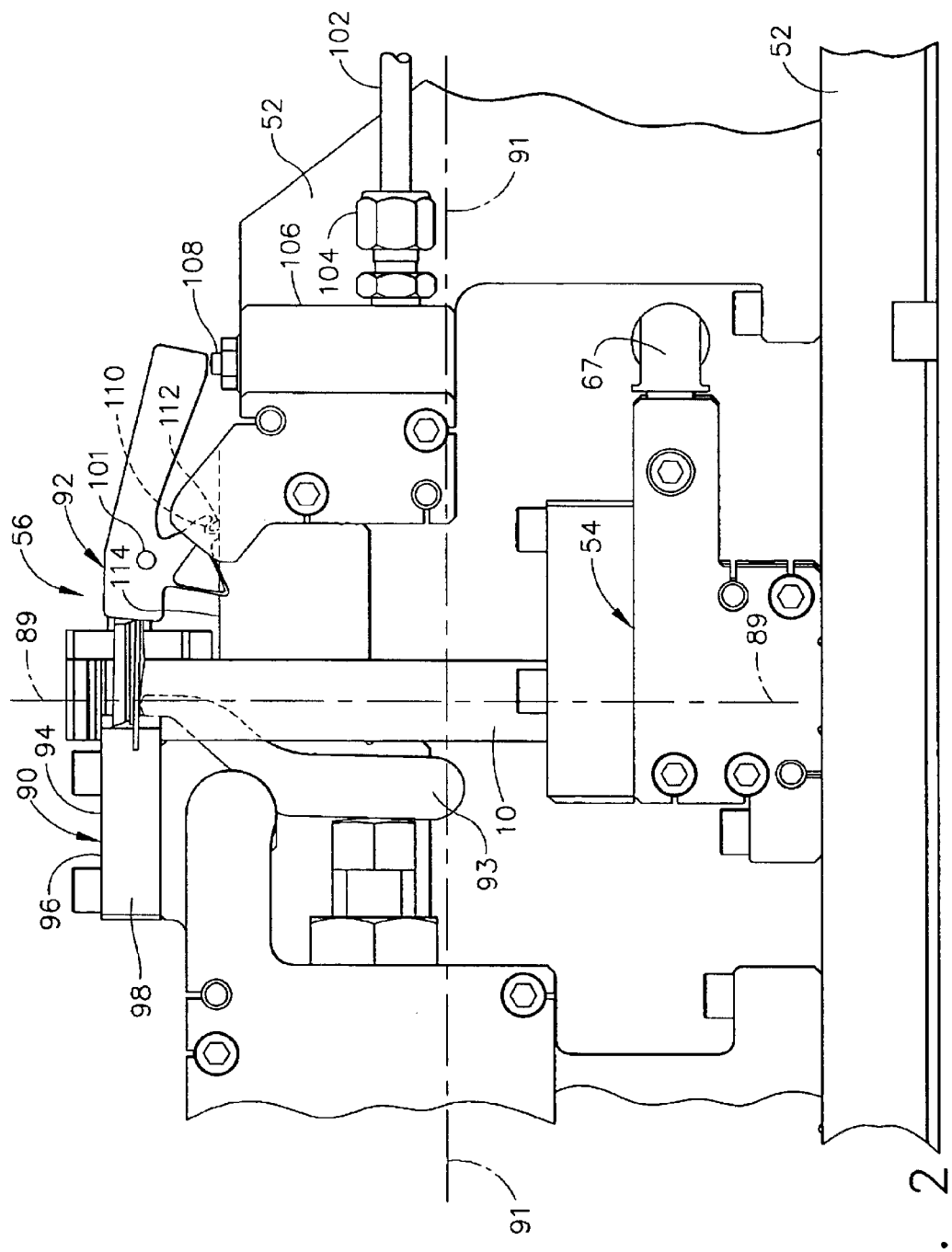
FIG. 2 is a side view of a fixture assembly for securing a component, such as the gas turbine engine blade shown in FIG. 1, in position during manufacture.

FIG. 2 is a side view of a fixture assembly 50 for securing turbine blade 10 in position for manufacture. Fixture assembly 50 includes a fixture 52 used for manufacturing processes, a dovetail clamp assembly 54 coupled to fixture 52, and a tip shroud clamp assembly 56 coupled to fixture 52. Dovetail clamp assembly 54 and tip shroud clamp assembly 56 are coupled to fixture 52 using any suitable coupling means. For example, in one embodiment, at least one of dovetail clamp assembly 54 and tip shroud clamp assembly 56 is coupled to fixture 52 using threaded bolts and threaded nuts. In another embodiment, at least one of dovetail clamp assembly 54 and tip shroud clamp assembly 56 are coupled to fixture 52 using threaded bolts and threaded openings in fixture 52. Prior to undergoing a manufacturing process, a cast turbine blade 10 is vertically loaded into fixture assembly 50.

Dovetail clamp assembly 54 aligns blade dovetail 14 (shown in FIG. 1) such that dovetail 14 is secured in a position with respect to fixture 52 that facilitates accurate manufacturing of blade 10. Tip shroud clamp assembly 56 locates the blade tip shroud such that tip shroud 28 is maintained in a position with respect to fixture 52 that facilitates accurate manufacturing of blade 10. Accordingly, using dovetail clamp assembly 54 and tip shroud clamp assembly 56, fixture assembly 50 facilitates locating, securing, and retaining blade 10 in a position with respect to fixture 52 to facilitate accurate manufacturing of blade 10.

Figure 3:
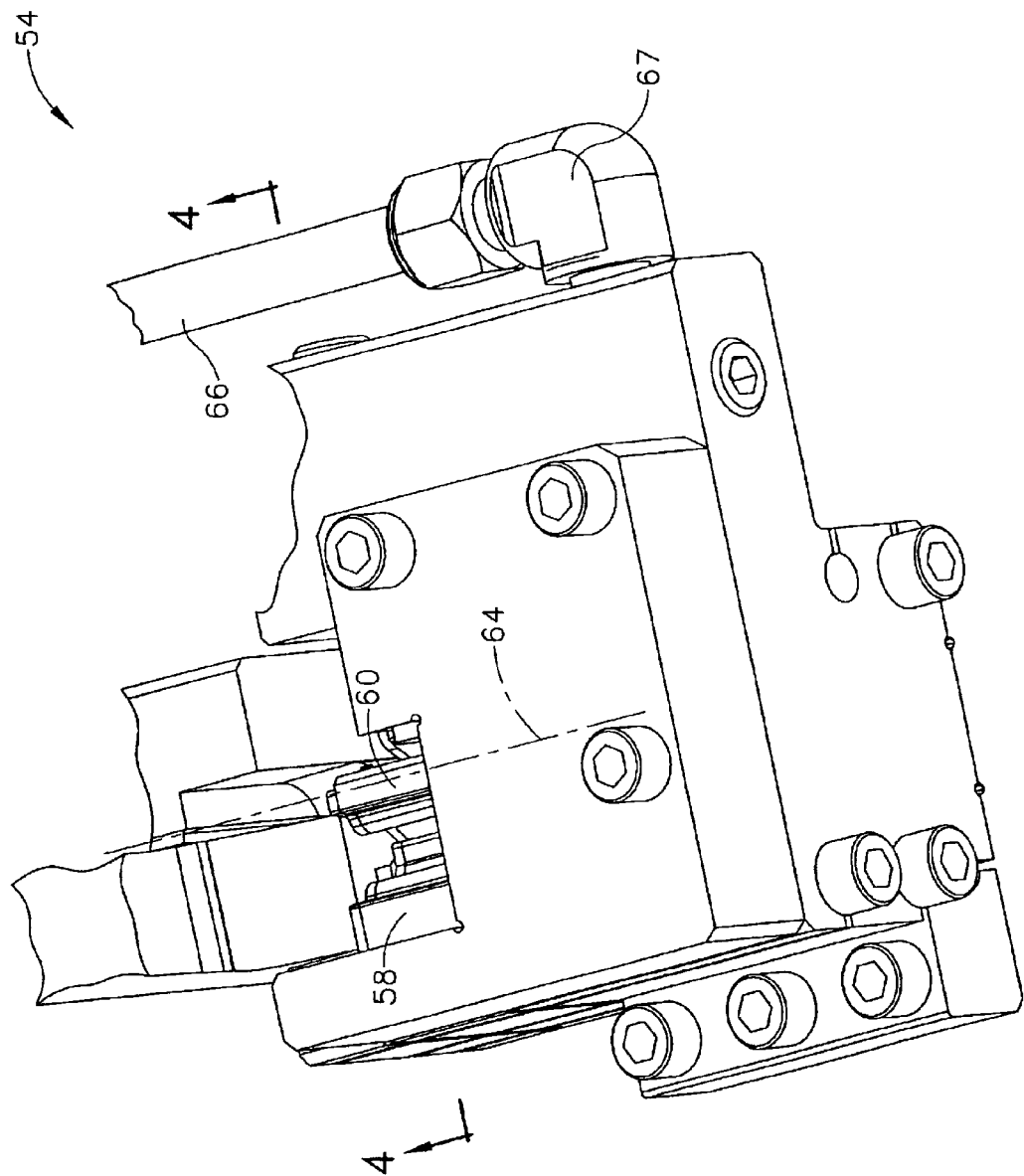
FIG. 3 is a perspective view of a dovetail clamp assembly portion of the fixture shown in FIG. 2.
Figure 4:
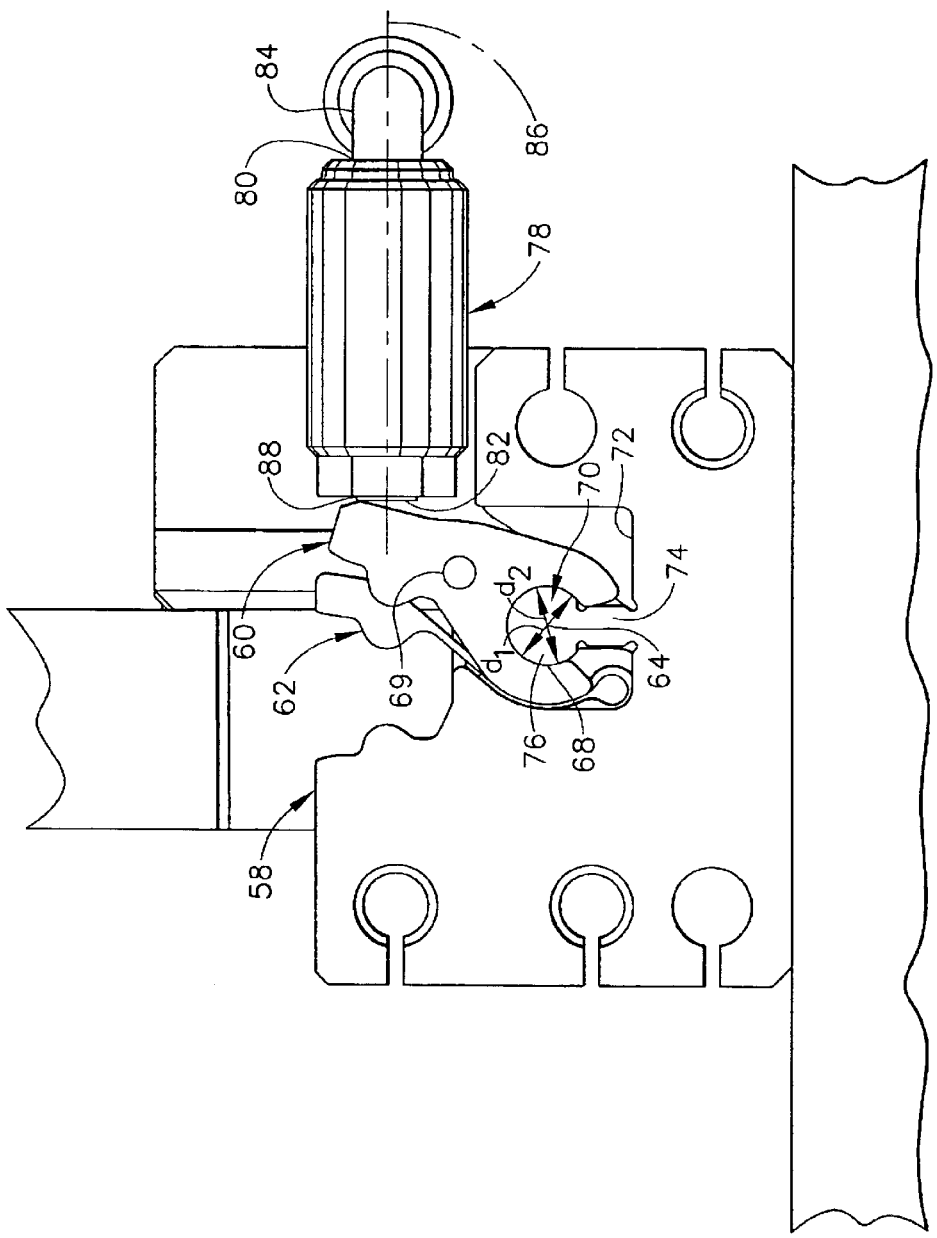
FIG. 4 is a cross-sectional view of the fixture shown in FIG. 3 and taken along line 4—4 and in an unclamped position.

FIG. 3 is a perspective view of dovetail clamp assembly 54. Dovetail clamp assembly 54 includes a first clamping member 58, a second clamping member 60, and a biasing mechanism 62. FIG. 4 is a cross-sectional view of dovetail second clamping taken along line 4—4 of FIG. 3 and illustrating clamping member 60 in an unclamped position. First clamping member 58 is fixedly coupled to dovetail clamp assembly 54 such that first clamping member 58 does not move with respect to fixture 52. More specifically, first clamping member 58 is fixedly coupled to dovetail clamp assembly 54 using any suitable coupling means. For example, in one embodiment, first clamping member 58 is coupled to dovetail clamp assembly 54 using threaded bolts and threaded nuts. In another embodiment, first clamping member 58 is coupled to dovetail clamp assembly 54 using threaded bolts and threaded holes in dovetail clamp assembly 54.

Second clamping member 60 is rotatably coupled to fixture 52 such that second clamping member 60 rotates with respect to fixture 52, about an axis of rotation 64. More specifically, and as described in greater detail below, second clamping member 60 rotates about axis 64 between a 'clamped' position (shown in FIG. 5) and an 'unclamped' position (shown in FIG. 4). Second clamping member 60 is rotated between the 'clamped' and 'unclamped' positions using any suitable means. For example, in the exemplary embodiment shown in FIGS. 2–5, second clamping member 60 is driven using hydraulic fluid supplied from a source external to fixture assembly 50 through a hydraulic fluid supply line 66 and a supply line fitting 67. When second clamping member 60 is in the 'clamped' position, first clamping member 58 and second clamping member 60 fixedly secure dovetail 14 in a position that facilitates accurate manufacturing of blade 10.

In the exemplary embodiment, second clamping member 60 includes a pin 69 coupled thereto in any suitable manner. Pin 69 is coupled to a second clamp biasing mechanism (not shown), which is coupled to dovetail clamp assembly 54, or alternatively fixture 52, in any suitable manner. The second clamp biasing mechanism biases pin 69 to rotate about axis 64 in a direction away from first clamping member 58. Pin 69 and the second clamp biasing mechanism thereby facilitate biasing second clamping member 60 to rotate from the 'clamped' position to the 'unclamped' position. In an alternative embodiment, second clamping member 60 does not include pin 69 and the second clamp biasing mechanism directly biases second clamping member 60 from the 'clamped' position to the 'unclamped' position. In one embodiment, the second clamp biasing mechanism is a spring.

In the exemplary embodiment, second clamping member 60 also includes a semi-cylindrical opening 68 extending through second clamping member 60 along axis 64, and dovetail clamp assembly 54 includes a semi-cylindrical projection 70 extending outwardly from a surface 72 of dovetail clamp assembly 54 and extending along a portion of axis 64. Semi-cylindrical projection 70 includes a stem portion 74 that extends from surface 72, and a cylindrically-shaped portion 76 that extends from stem portion 74. Cylindrically-shaped portion 76 is received within semi-cylindrical opening 68 such that second clamping member 60 is supported by semi-cylindrical projection 70. A diameter $d_1$ of cylindrically-shaped portion 76 is slightly smaller than a diameter $d_2$ of semi-cylindrical opening 68 such that second clamping member 60 is freely rotatable about semi-cylindrical projection 70 and axis 64. In one embodiment, diameter $d_1$ is 0.2 inches smaller than diameter $d_2$. In an alternative embodiment (not shown), a bearing (not shown) is positioned between semi-cylindrical projection 70 and semi-cylindrical opening 68 to facilitate rotation of second clamping member 60 about semi-cylindrical projection 70 and axis 64. Although second clamping member 60 is illustrated and described herein as rotatably coupled to dovetail clamp assembly 54 in the exemplary manner, it will be understood that second clamping member 60 may be rotatably coupled to dovetail clamp assembly 54 in any suitable manner. For example, in an alternative embodiment (not shown), second clamping member 60 is fixedly coupled with a rod (not shown) that is rotatably coupled with dovetail clamp assembly 54.

As described above, in the exemplary embodiment described herein and shown in FIGS. 2–5, rotation of second clamping member 60 between the 'clamped' position and the 'unclamped' position is driven by hydraulic fluid. More specifically, dovetail clamp assembly 54 includes a hydraulic cylinder 78 that includes an intake port 80, an internal chamber (not shown), and a rod 82. Intake port 80 is in fluid communication with the internal chamber and is coupled in fluid communication with an intake port supply line 84 that is coupled in fluid communication with supply line fitting 67. Supply line fitting 67 is coupled in fluid communication with hydraulic fluid supply line 66, which is coupled in fluid communication with a hydraulic fluid source external to fixture assembly 50. An internal chamber of hydraulic cylinder 78 includes a piston (not shown) that is slidable within the internal chamber of hydraulic cylinder 78 along a central axis 86 of hydraulic cylinder 78. Rod 82 is coupled to the piston and extends outwardly through a portion of the hydraulic cylinder internal chamber and through an opening 88 in hydraulic cylinder 78 to second clamping member 60. Opening 88 includes a sealing means (not shown) that extends circumferentially between rod 82 and opening 88 to facilitate sealing the internal chamber of hydraulic cylinder 78. Rod 82 is moveable within opening 88 along central axis 86.

When pressure is applied to the hydraulic fluid within the internal chamber of hydraulic cylinder 78, the piston slides along central axis 86 in the direction of second clamping member 60, causing rod 82 to move through opening 88 along central axis 86 in the direction of second clamping member 60. When rod 82 has traveled a distance along central axis 86, rod 82 contacts second clamping member 60 and continuing travel of rod 82 along central axis 86 in the direction of second clamping member 60 causes second clamping member 60 to rotate about axis 64 from the 'unclamped' position to the 'clamped' position. When pressure is removed from the internal chamber of hydraulic cylinder 78, deformation of the sealing means for opening 88, caused by the movement of rod 82 within opening 88, biases rod 82 to move within opening 88 along central axis 86 and away from second clamping member 60. Furthermore, the second clamp biasing mechanism biases pin 69 to rotate about axis 64 in a direction away from first clamping member 58, thereby causing second clamping member 60 to rotate about axis 64 in a direction away from first clamping member 58. Accordingly, when pressure is removed from the hydraulic fluid within the internal chamber of hydraulic cylinder 78, second clamping member 60 rotates about axis 64 from the 'clamped' position to the 'unclamped' position.

Biasing mechanism 62 is fixedly coupled to dovetail clamp assembly 54 using any suitable coupling means. In one embodiment, biasing mechanism 62 is coupled to dovetail clamp assembly 54 using threaded bolts and threaded nuts. In another embodiment biasing mechanism 62 is coupled to dovetail clamp assembly 54 using threaded bolts and threaded holes in dovetail clamp assembly 54. At least a portion of dovetail 14 is received within a portion of biasing mechanism 62. Furthermore, at least a portion of dovetail 14 is received within a portion of first clamping member 58.

Blade 10 loaded into fixture assembly 50 along an axis 89. Because blade 10 is loaded into fixture assembly 50 along axis 89, rather than an axis 91 that is perpendicular to axis 89, a small amount of travel of rod 82 along central axis 64 can be maintained. When blade 10 is loaded into fixture assembly 50, dovetail 14 is received within dovetail clamp assembly 54. Biasing mechanism 62 deforms to allow a portion of dovetail 14 to be received within a portion of biasing mechanism 62 and a portion of first clamping member 58. After dovetail 14 is received within biasing mechanism 62 and first clamping member 58, biasing mechanism 62 biases dovetail 14 against first clamping member 58 thereby securing dovetail 14 against first clamping member 58. By securing dovetail 14 against first clamping member 58, biasing mechanism 62 causes dovetail 14 to be frictionally coupled with first clamping member 58 such that dovetail 14 remains in position with respect to first clamping member 58 while under the bias of biasing mechanism 62 and prior to clamping with second clamping member 60.

When secured against first clamping member 58, biasing mechanism 62 biases dovetail 14 in a position that facilitates accurate manufacturing of blade 10 and retains dovetail 14 in the position while second clamping member is in the 'unclamped' position. Once dovetail 14 is secured against first clamping member 58, second clamping member 60 is rotated to the 'clamped' position to fixedly secure dovetail 14 in position for manufacturing of blade 10.

Although biasing mechanism 62 is herein described and illustrated in the exemplary manner, it will be understood that biasing mechanism 62 may be any other suitable shape and/or type of biasing mechanism that secures dovetail 14 against first clamping member 58 to thereby align dovetail 14 into a position facilitating accurate manufacturing of blade 10 and retain dovetail 14 in the position facilitating accurate manufacturing of blade 10 while second clamping member is in the 'unclamped' position. In one embodiment, biasing mechanism 62 is a spring. For example, in one embodiment biasing mechanism 62 is a helical spring. In another embodiment, biasing mechanism 62 is a plate spring. In yet another embodiment, biasing mechanism 62 is a leaf spring.

Figure 5:
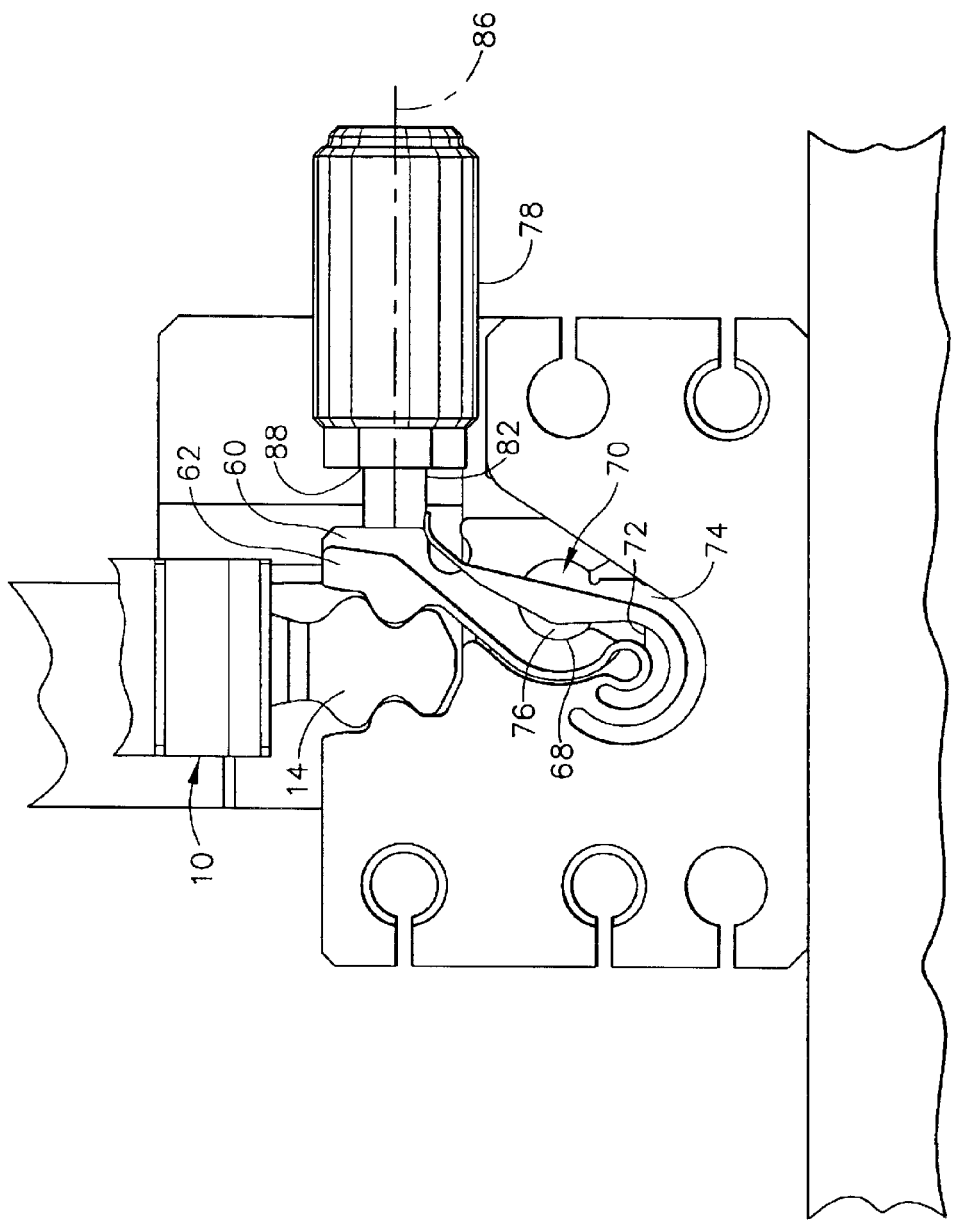
FIG. 5 is a cross-sectional view of the fixture shown in FIG. 4 and in a clamped position.

FIG. 5 is a cross-sectional view of dovetail second clamping member 60 in the 'clamped' position. To facilitate accurate manufacturing of blade 10, second clamping member 60 is rotated from the 'unclamped' position (shown in FIG. 4) to the 'clamped' position while dovetail 14 is secured against first clamping member 58 by biasing mechanism 62. In one embodiment, the shape of a portion of second clamping member 60 is complimentary to the profile of dovetail 14 such that at least a portion of dovetail 14 is received within a portion of second clamping member 60. As described above, when pressure is applied to the internal chamber of hydraulic cylinder 78, actuation of rod 82 causes second clamping member 60 to rotate from the 'unclamped' position to the 'clamped' position.

When second clamping member 60 is in the 'clamped' position, dovetail 14 is frictionally coupled with first clamping member 58 and second clamping member 60 such that dovetail 14 remains in position with respect to first clamping member 58, second clamping member 60, and fixture 52 while second clamping member 60 is in the 'clamped' position. The portions of second clamping member 60 and first clamping member 58 that are complimentarily shaped with respect to the profile of dovetail 14 are configured such that when dovetail 14 is received within second clamping member 60 and first clamping member 58, dovetail 14 is fixedly secured between first clamping member 58 and second clamping member 60 in a position with respect to fixture 52, thus facilitating accurate manufacturing of blade 10. More specifically, the force applied to dovetail 14 by first clamping member 58 and second clamping member 60 while second clamping member 60 is in the 'clamped' position is sufficient to maintain dovetail 14 in position to facilitate accurate manufacturing of blade 10 and without distorting the profile and/or features of blade 10.

Referring again to FIG. 2, tip shroud clamp assembly 56 includes a component locator 90, a clamping member 92, herein referred to as third clamping member 92, and a shroud work support lever 93 that is coupled to tip shroud clamp assembly 56. Shroud work support lever 93 facilitates supporting blade 10 during manufacturing of blade 10. Component locator 90 includes a coolant guide 94 that includes a plurality of grooves (not shown in FIG. 5) in a surface 96 of component locator 90. Cooling guide 90 directs coolant from a coolant source (not shown) to blade 10 during manufacturing of blade 10. In an alternative embodiment, cooling guide 94 includes a plurality of passageways extending through a body 98 of component locator 90. It will be understood that coolant guide 94 may be configured in any manner such that coolant guide 94 directs coolant to blade 10 during manufacturing of blade 10.

Component locator 90 is fixedly coupled to tip shroud clamp assembly 56 such that component locator 90 does not move with respect to fixture 52. Component locator 90 is coupled to tip shroud clamp assembly 56 using any suitable coupling means. In one embodiment, component locator 90 is coupled to tip shroud clamp assembly 56 using threaded bolts and threaded nuts. In another embodiment component locator 90 is coupled to tip shroud clamp assembly 56 using threaded bolts and threaded holes in tip shroud clamp assembly 56. A portion 116 (shown in FIG. 6) of component locator 90 is shaped complimentarily to the profile of tip shroud 28 of blade 10 such that at least a portion of tip shroud 28 of blade 10 is received within component locator 90.

Third clamping member 92 is rotatably coupled to fixture 52 such that third clamping member 92 rotates with respect to fixture 52 and about an axis of rotation 100 and between a 'clamped' position (shown in FIG. 2) and an 'unclamped' position (not shown). When third clamping member 92 is in the 'clamped' position, component locator 90 and third clamping member 92 fixedly secure the blade tip shroud in a position that facilitates accurate manufacturing of blade 10 during manufacturing of blade 10. In the exemplary embodiment, third clamping member 92 includes a pin 101 coupled thereto in any suitable manner. Pin 101 engages with a third clamping member biasing mechanism (not shown), which is coupled to tip shroud clamp assembly 54, or alternatively fixture 52, in any suitable manner. The third clamping member biasing mechanism biases pin 101 to rotate about axis 100 in a direction away from component locator 90. Pin 101 and the third clamping member biasing mechanism thereby facilitate biasing third clamping member 92 to rotate from the 'clamped' position to the 'unclamped' position. In an alternative embodiment, third clamping member 92 does not include pin 101 and the third clamping member biasing mechanism directly biases third clamping member 92 from the 'clamped' position to the 'unclamped' position. In one embodiment, the third clamping member biasing mechanism is a spring.

Rotation of third clamping member 92 between the 'clamped' and 'unclamped' positions is driven by any suitable means. For example, in the exemplary embodiment shown in FIG. 5 and described herein, third clamping member 92 is driven by hydraulic fluid supplied from an external source to fixture assembly 50 through a hydraulic fluid supply line 102 and a supply line fitting 104 to a hydraulic cylinder 106. Tip shroud clamp assembly 56 includes a rod 108 coupled to a piston (not shown) in an internal chamber (not shown) of hydraulic cylinder 106. The operation of hydraulic cylinder 106 to actuate rotation of third clamping member 92 about axis 100 is substantially similar to the actuation of second clamping member 60 by hydraulic cylinder 78. More specifically, when pressure is applied to the hydraulic fluid within the internal chamber of hydraulic cylinder 106, rod 108 causes third clamping member 92 to rotate about axis 100 from the 'unclamped' position to the 'clamped' position. When pressure is removed from the internal chamber of hydraulic cylinder 106, rod 108 is biased away from third clamping member 92 and the third clamping member biasing mechanism biases pin 101 to rotate about axis 100 in a direction away from component locator 90, thereby causing third clamping member 92 to rotate about axis 100 in a direction away from component locator 90. Accordingly, when pressure is removed from the hydraulic fluid within the internal chamber of hydraulic cylinder 106, third clamping member 92 rotates about axis 100 from the 'clamped' position to the 'unclamped' position.

In the exemplary embodiment, third clamping member 92 includes a semi-cylindrical opening 110 extending through third clamping member 92 along axis 100, and tip shroud clamp assembly 56 includes a semi-cylindrical projection 112 extending outward from a surface 114 of tip shroud clamp assembly 56 and extending along a portion of axis 100. Semi-cylindrical projection 112 extends from surface 114 and is received within semi-cylindrical opening 110 such that third clamping member 92 is supported by semi-cylindrical projection 112. The diameter of semi-cylindrical projection 112 is slightly smaller than the diameter of semi-cylindrical opening 110 such that third clamping member 92 is free to rotate about semi-cylindrical projection 112 and axis 100. In one embodiment, the diameter of semi-cylindrical projection 112 is 0.2 inches smaller than the diameter of semi-cylindrical opening 110. In an alternative embodiment (not shown), a bearing (not shown) is positioned between semi-cylindrical projection 112 and semi-cylindrical opening 110 to facilitate rotation of third clamping member 92 about semi-cylindrical projection 112 and axis 100. Although third clamping member 92 is illustrated and described herein as rotatably coupled to tip shroud clamp assembly 56 in the exemplary manner, it will be understood that third clamping member 92 may be rotatably coupled to tip shroud clamp assembly 56 in any suitable manner.

Figure 6:
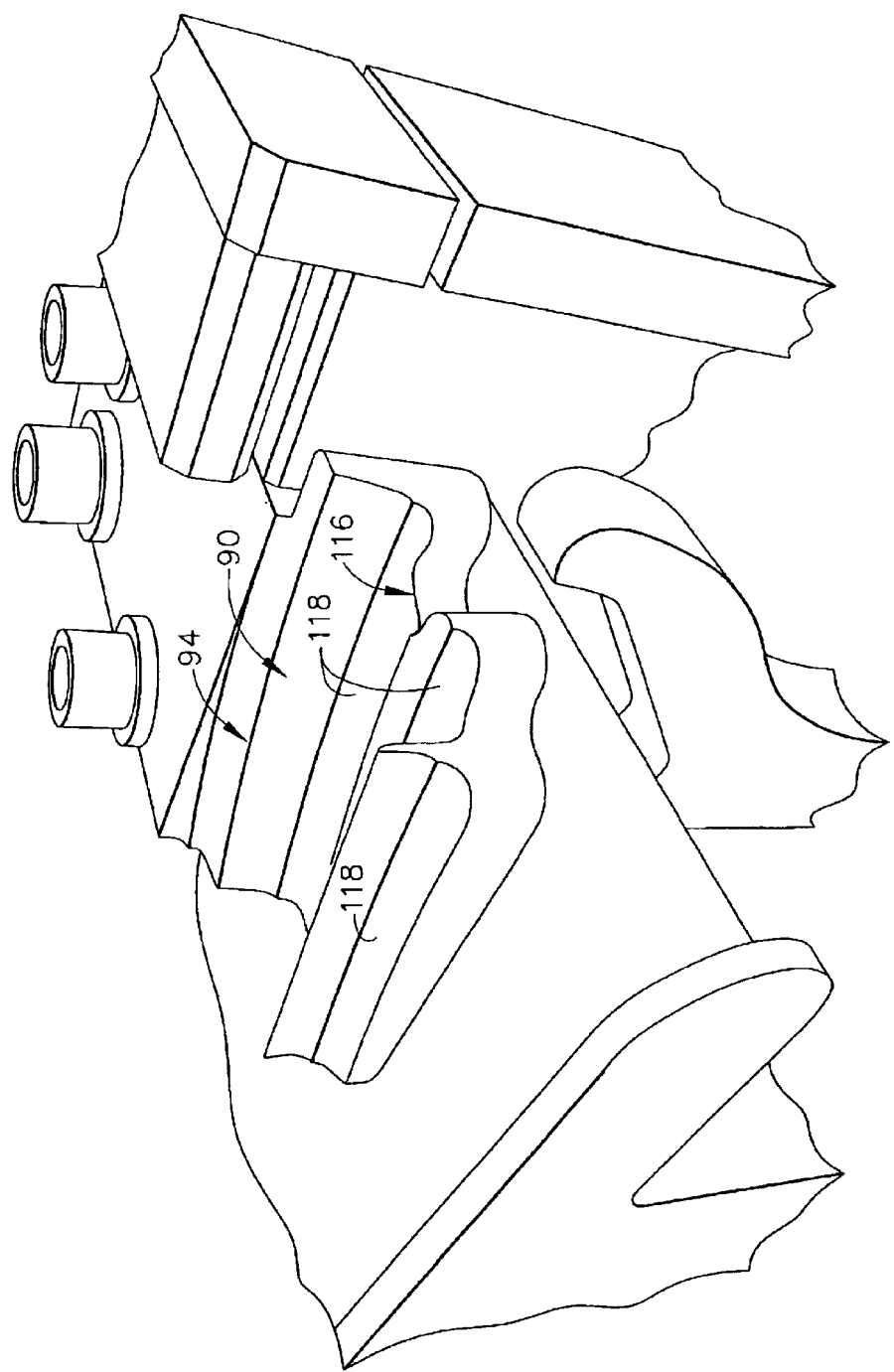
FIG. 6 is a perspective view of a component locator used with the fixture shown in FIG. 2.

FIG. 6 is a perspective view of component locator 90 including coolant guide 94 and tip shroud portion 116. Tip shroud portion 116 is shaped with respect to the profile of the blade tip shroud such that when the blade tip shroud is secured against component locator 90, tip shroud 28 is in a position with respect to fixture 52 to facilitate accurate manufacturing of blade 10. In one embodiment, the shape of a portion (not shown) of third clamping member 92 is complimentary to the profile of the blade tip shroud 10 such that at least a portion of the blade tip shroud is received within a portion of third clamping member 92.

Blade 10 loaded into fixture assembly 50 along an axis 89. Because blade 10 is loaded into fixture assembly 50 along axis 89, rather than an axis 91 that is perpendicular to axis 89, a small amount of travel of rod 108 along axis 100 can be maintained. When blade 10 is loaded into fixture assembly 50, the blade tip shroud of blade 10 is received within tip shroud clamp assembly 56, and dovetail clamp assembly 54 fixedly secures dovetail 14 in a position with respect to fixture 52 to facilitate accurate manufacturing of blade 10. As blade 10 is loaded into tip shroud clamp assembly 56, component locator 90 locates tip shroud 28 in a position to facilitate accurate manufacture of blade 10. After the blade tip shroud of blade 10 is located by component locator 90, third clamping member 92 is rotated from the 'unclamped' position to the 'clamped' position to fixedly secure the blade tip shroud in position to facilitate accurate manufacturing of blade 10. In one embodiment, second clamping member 60 is rotated to the 'clamped' position before third clamping member 92. In another embodiment, third clamping member 92 is rotated to the 'clamped' position before second clamping member 60. In yet another embodiment, third clamping member 92 and second clamping member 60 are rotated to the 'clamped' position substantially simultaneously.

As described above, actuation of rod 108 causes third clamping member 92 to rotate from the 'unclamped' position to the 'clamped' position. When third clamping member 92 is in the 'clamped' position, tip shroud 28 is frictionally coupled with component locator 90 and third clamping member 92 such that tip shroud 28 of blade 10 will remain in position with respect to component locator 90, third clamping member 92, and fixture 52 during manufacturing. The portions of component locator 90 and third clamping member 92 that are complimentarily shaped with respect to the profile of tip shroud 28 of blade 10 are received within the respective complimentarily shaped portions of component locator 90 and third clamping member 92. Furthermore, during manufacturing shroud work support lever 93 contacts bottom surface 30 (shown in FIG. 1) of tip shroud 28. Shroud work support lever 93 facilitates fixedly securing tip shroud 28 in a position that facilitates accurate manufacturing of blade 10 by supporting bottom surface 30. More specifically, shroud work support lever 93 facilitates preventing tip shroud 28 from flexing, and thereby distorting the profile and/or features of blade 10, during manufacturing by supporting bottom surface 30.

In one embodiment, tip shroud 28 is manufactured using a creep feed grinder to machine a profile of tip shroud 28. Because the tip shroud profile is machined using a grinding process, a lubris coolant is directed between a grinding surface (not shown) and a surface (not shown) of tip shroud 28 being ground. Coolant grooves 118 direct the flow of coolant to fixture assembly 50 to blade 10 between the grinding surface and the surface of tip shroud 28 being ground. Although coolant guide 94 is shown and described herein as including coolant grooves 118, it will be understood that coolant guide 94 may be configured in any manner, including for example function and structure, such that coolant guide 94 directs coolant to blade 10 between the grinding surface and the surface of tip shroud 28 being ground during manufacturing of blade 10. Once the grinding process is complete, pressure is removed, and third clamping member 92 rotates about axis 100 from the 'clamped' position to the 'unclamped' position.

Fixture assembly 50 fixedly secures blade 10 in a position to facilitate accurate manufacturing of blade 10 during manufacture, without distorting the profile and/or features of blade 10, and while providing coolant to the surface being manufactured. In addition, fixture assembly 50 aligns blade 10, including dovetail 14 and tip shroud 28 of blade 10, in a position facilitating accurate manufacturing of blade 10 with minimal input from an operator.

The above-described tool is cost-effective and highly reliable for securing a component during manufacturing. The tool permits a blade dovetail and a tip shroud to be secured during manufacturing. More specifically, the tool rigidly secures the blade dovetail and tip shroud in a position without distorting the profile and/or features of the blade. The tool may also facilitate securing a blade dovetail and tip shroud during manufacturing without the use of multiple machines, fixtures, and/or processes. Because the blade may be self-oriented once coupled to the tool, the tool requires minimal input from an operator. As a result, the tool facilitates reducing manufacturing costs in a cost-effective and reliable manner.

Exemplary embodiments of tool assemblies are described above in detail. The systems are not limited to the specific embodiments described herein, but rather, components of each assembly may be utilized independently and separately from other components described herein. Each tool assembly component can also be used in combination with other tool assembly components.

While the invention has been described in terms of various specific embodiments, those skilled in the art will recognize that the invention can be practiced with modification within the spirit and scope of the claims.

What is claimed is:

1. A tool for retaining a gas turbine engine blade, wherein the blade includes a dovetail portion, said tool comprising:
   a fixture;
   a first clamping member fixedly coupled to said fixture;
   a biasing mechanism fixedly coupled to said fixture for biasing the dovetail portion against said first clamping member, wherein at least a portion of said biasing mechanism is sized to receive at least a portion the dovetail portion therein; and
   a second clamping member coupled to said fixture, said first and second clamping members configured to retain the component therebetween.

2. A tool in accordance with claim 1 wherein said biasing mechanism configured to bias the component against said first clamping member such that the component is secured in position with respect to said fixture.

3. A tool in accordance with claim 1 wherein said biasing mechanism comprises a spring.

4. A tool in accordance with claim 1 wherein the component is a gas turbine engine blade including a dovetail portion, at least one of said first clamping member and said second clamping member sized to receive at least a portion of the dovetail portion therein.

5. A tool in accordance with claim 1 wherein said second clamping member rotatable with respect to said fixture about an axis of rotation.

6. A tool in accordance with claim 5 further comprising a hydraulic cylinder coupled to said fixture for controlling rotation of said second clamping member.

7. A tool in accordance with claim 1 wherein said second clamping member rotatable between an unclamped position wherein said second clamping member does not contact the component, and a clamped position wherein the component is frictionally coupled between said first clamping member and said second clamping member.

8. A tool in accordance with claim 1 wherein said first clamping member and said second clamping member fixedly secure the component in position with respect to said fixture.

9. An apparatus for securing a component, said apparatus comprising:
   a fixture;
   a first clamping member fixedly coupled to said fixture;
   a biasing mechanism fixedly coupled to said fixture and configured to bias the component against said first clamping member; and
   a second clamping member coupled to said fixture, said first and second clamping members configured to fixedly secure the component in position with respect to said fixture, wherein said second clamping member is configured to rotate with respect to said fixture about an axis of rotation.

10. An apparatus in accordance with claim 9 wherein said biasing mechanism configured to secure the component against said first clamping member such that the component is aligned with respect to said fixture.

11. An apparatus in accordance with claim 9 wherein said biasing mechanism comprises a spring.

12. An apparatus in accordance with claim 9 further comprising a hydraulic cylinder coupled to said fixture for controlling rotation of said second clamping member.

13. An apparatus in accordance with claim 9 wherein said second clamping member selectively positionable between an unclamped position, wherein said second clamping member does not contact the component, and a clamped position wherein the component is frictionally coupled between said first clamping member and said second clamping member.

* * * * *